United States Patent [19]

Santo

[11] E Patent Number: Re. 32,665

[45] Reissued Date of Patent: May 17, 1988

[54] FLOATATION SLEEP SYSTEM

[76] Inventor: Philip J. Santo, 12 Mountain Rd., Rochester, N.Y. 14525

[21] Appl. No.: 760,244

[22] Filed: Jul. 29, 1985

Related U.S. Patent Documents

Reissue of:

[64] Patent No.: 4,513,463
Issued: Apr. 30, 1985
Appl. No.: 475,332
Filed: Mar. 14, 1983

U.S. Applications:

[63] Continuation-in-part of Ser. No. 450,022, Dec. 15, 1982, abandoned.

[51] Int. Cl.[4] ..... A47C 27/10; A61G 7/04

[52] U.S. Cl. ..... 5/452; 5/451

[58] Field of Search ..... 5/452, 451, 455, 450, 5/449, 441, 422, 400

[56] References Cited

U.S. PATENT DOCUMENTS

| | | | |
|---|---|---|---|
| 3,735,432 | 5/1973 | Kreten et al. | 5/451 |
| 4,079,473 | 3/1978 | Phillips | 5/452 |
| 4,100,635 | 7/1978 | Mitchell et al. | 5/452 |
| 4,145,780 | 3/1979 | Fogel | 5/400 |
| 4,245,364 | 1/1981 | Calleance | 5/452 |
| 4,334,331 | 6/1982 | Santo | 5/452 |
| 4,352,217 | 10/1982 | O'Rourke | 5/451 |
| 4,371,998 | 2/1983 | Callaway | 5/451 |

*Primary Examiner*—Alexander Grosz
*Attorney, Agent, or Firm*—Lawrence P. Kessler

[57] ABSTRACT

An improved floatation sleep system of universal type wherein the bladder may be readily replaced. Such system comprises a marginal perimeter support including [a continuous] *an* elongated chamber. The chamber has a plurality of cells, the interior of which are respectively readily accessible to supply perimeter support means such as support material or pressurized air. A first flexible, dimensionally stable, fluid impervious sheet is connected to an upper portion of the elongated chamber. This sheet is of an overall dimension greater than the distance between opposed portions of such chamber, and less than the distance between opposed portions plus twice the vertical height of such chamber. A second flexible, dimensionally stable sheet extends between the opposed portions of such chamber. This second sheet is connected to the upper portion of at least a part of such chamber and is readily releasably secured to the remaining part of such chamber to provide access to an interior chamber formed by the first and second sheets. A bladder, adapted to contain body supporting means, is readily removably located in such interior chamber.

15 Claims, 2 Drawing Sheets

FLOATATION SLEEP SYSTEM

Matter enclosed in heavy brackets [ ] appears in the original patent but forms no part of this reissue specification; matter printed in italics indicates the additions made by reissue.

BACKGROUND OF THE INVENTION

Related U.S. Patent Application

This application is a continuation-in-part of U.S. patent application Ser. No. 450,022 filed Dec. 15, 1982 in the name of P. J. Santo now abandoned.

This invention relates generally to floatation sleep systems, and more particularly to an improved universal sleep system.

Floatation sleep systems, commonly referred to as waterbeds, have become a popular alternative to conventional bedding. Such popularity is due to the fact that waterbeds provide totally balanced body support which has been found to induce a superior state of relaxation. The first waterbeds were free standing, flexible bladders filled with water. However, since the free standing bladder was flexible in all directions, it was necessary that it have a vertical dimension (height) to prevent "bottoming out" when the body was supported on the bladder. This height made it awkward to get on and off the bladder, and the fact that the side walls of the bladder were flexible made sitting on the edge difficult. Therefore, a rigid frame was added, the frame being located around the lateral marginal edges of the flexible bladder. While the frame supported the bladder to maintain a desired height and prevent bottoming out, sitting on the edge and getting in and out of the waterbed over the frame was still uncomfortable.

In order to improve the comfort of the waterbed, the frame was replaced by a compressible air chamber along the lateral marginal edges of the flexible bladder, such as shown in U.S. Pat. Nos. 3,778,852 issued Dec. 18, 1983 in the name of Penn et al, and 4,079,473 issued Mar. 21, 1978 in the name of Philips, for example. The air chamber provided comfort when entering and exiting the bed and when sitting on the edge thereof, and in addition maintained the fluid bladder at a desired height to prevent bottoming out.

Additionally, the structure of the liquid-containing bladder of the floatation sleep system has been in a continuing state of advancement for the purpose of perfecting the quality of relaxation of the system. For example, baffles of different configurations have been added to the bladders to dampen the motion of the liquid within the bladder. One of the most recent advances in bladder construction to dampen liquid motion is the addition of materials such as foam or expanded fiber fill (see, for example, U.S. Pat. No. 4,301,560, issued Nov. 24, 1981 in the name of Fraige). However, no matter what the bladder configuration, the overall sleep system is of unitary construction, that is all of its components are structurally interrelated and thus indivisable. Therefore, if an improvement comes along in the bladder or perimeter support construction, or one's desires for overall system characteristics changes, the whole system has to be changed. This results in the unduly expensive proposition of replacing the entire system or putting off changing to a system that would otherwise provide physiological or psychological benefits.

SUMMARY OF THE INVENTION

This invention is directed to an improved floatation sleep system of universal type wherein the bladder may be readily replaced. Such system comprises a marginal perimeter support including [a continuous] *an* elongated chamber. The chamber has a plurality of cells, the interior of which are respectively readily accessible to supply perimeter support means such as support material or pressurized air. A first flexible, dimensionally stable, fluid impervious sheet is connected to an upper portion of the elongated chamber. This sheet is of an overall dimension greater than the distance between opposed portions of such chamber, and less than the distance between such opposed portions plus twice the vertical height of such chamber. A second flexible, dimensionally stable sheet extends between the opposed portions of such chamber. This second sheet is connected to the upper portion of at least a part of such chamber and is readily releasably secured to the remaining part of such chamber to provide access to an interior chamber formed by the first and second sheets. A bladder, adapted to contain body supporting means, is readily removably located in such interior chamber.

The invention, and its objects and advantages, will become more apparent in the detailed description of the preferred embodiments presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENTS

Referring now to the accompanying drawings, the improved universal floatation sleep system is designated generally by the numeral 10. This improved sleep system (waterbed) 10 includes a fluid-containing bladder 12 and a marginal perimeter support 14 for such bladder. While such elements are the [principle] *principal* elements of any air chamber sleep system of the prior art, their construction as described hereinbelow provides the universiality of this invention; i.e., the ability of the sleep system 10 to adapt to the state of the floatation sleep art without requiring the purchase and replacement of the system with an entirely new system.

Figure 1:
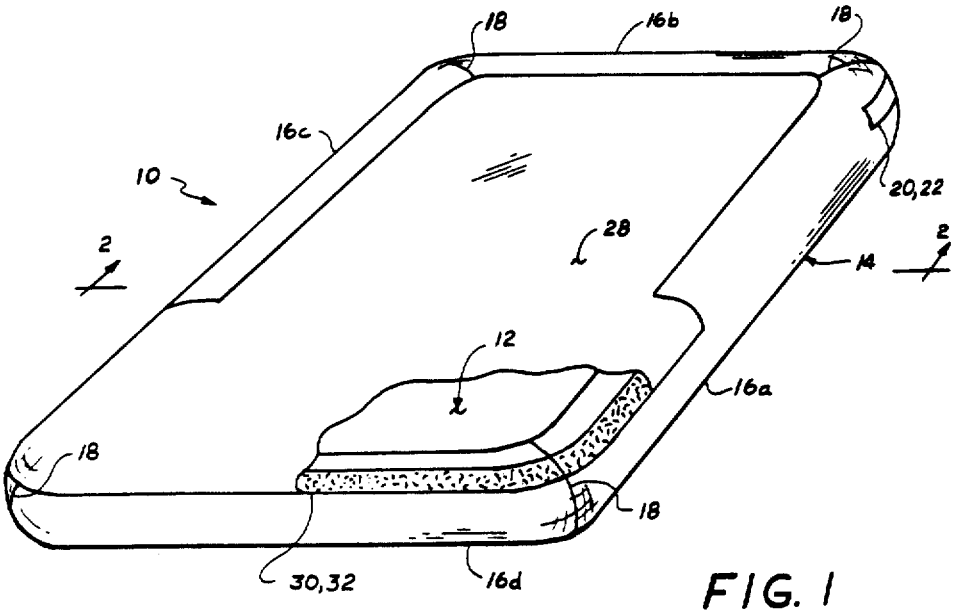
FIG. 1 is a top-front isometric view, with portions removed to facilitate viewing of the improved universal floatation sleep system according to this invention.
Figure 2:
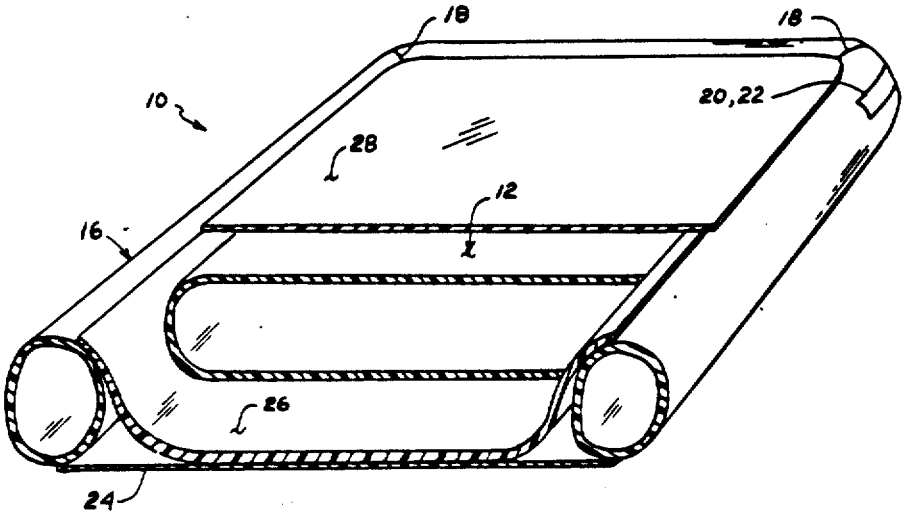
FIG. 2 is a top-front isometric view similar to FIG. 1 in cross-section to facilitate the showing of the elements of the sleep system according to this invention.

The perimeter support 14 is a substantially continuous elongated chamber 16 formed of flexible, dimensionally stable material such as polyethelene or polypropelene for example. The chamber 16 is configured to conform to the general shape of the bladder which it is intended to support. In FIGS. 1 and 2 the overall configuration of the chamber 16 is rectangular, but other shapes such as square or circular for example would be suitable. The chamber 16 defines a plurality of independent cells 16a, 16b, 16c, 16d. The independent cells may be individually sealed, such as by transverse sheets of flexible, dimensionally stable material and include valves for respectively pressurizing such cells as shown in my copending U.S. patent application Ser. No. 450,023 filed Dec. 15, 1982 *now U.S. Pat. No. 4,501,036.* Alternatively, the cells may form independent receptacles for removable support material containing [or] pressurized air tubes such as shown in my U.S. Pat. No. 4,181,990 issued Jan. 8, 1980, for example. If the cells accept removable tubes, the chamber 16 has openings 18 formed at the adjacent [intersectionse] *intersections* of the independent cells. The openings are [releasable] *releasably* secured by mating closure members 20, 22 such as releasably interlocking material hook and loop type fasteners, such as sold under the trademark VELCRO for example. In either instance the elongated chamber 16 is capable of being changed in accordance with advances in the state of the perimeter support art without necessitating the replacement of the entire system 10.

A first sheet 24 of flexible, dimensionally stable, fluid impervious material (e.g., similar to that making up the elongated chamber 16) is connected along edge 24a to the bottom portion of the elongated chamber 16 (see FIG. 3), such as by heat sealing for example. A second sheet 26 of similar material is similarly connected along edge 26a to the top portion of the elongated chamber 16 to form a bladder receiving cavity. The sheet 26 has transverse overall dimensions, between opposed marginal edges (e.g., edges connected to independent cells 16a, 16c, and edges connected to independent cells 16b, 16d), greater than the distance between the opposed portions of the elongated chamber 16 and less than the distance between such opposed portions plus twice the vertical height of such chamber. A third sheet 28 of similar material extends across the elongated chamber 16. The sheet 28 is similarly connected along an edge 28a to a portion of the elongated chamber 16 outwardly of edge 26a, such portion being substantially less than the full perimeter of the chamber 16 of such chamber. For the remaining portion of the perimeter, the sheet 28 is releasably secured to the chamber by mating closure members 30, 32, such as releasably interlocking material hook and loop type fasteners, such as sold under the trademark VELCRO for example. Of course, the sheet 28 may be releasably secured to the chamber 16 about is full perimeter such as by a draw string for example. The sheets 26 and 28 thus form a readily accessible chamber 34 adapted to receive and support the bladder 12.

Figure 4:
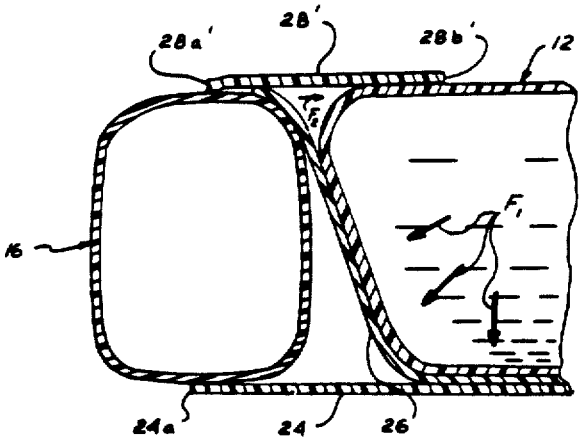
FIG. 4 is a view, similar to FIG. 3, in cross-section of a portion of an alternative embodiment of the improved universal floatation sleep system according to this invention.

Further, in the alternate embodiment of the floatation sleep system 10 according to this invention in FIG. 4, the sheet 28 may be replaced by strip of flexible dimensionally stable material 28'. The material 28' is connected along one edge 28b' directly to the bladder 12 such as by heat sealing for example. The opposite edge 28a' is releasably secured to the chamber 16 by interlocking material similar to that mentioned above. Of course, the material 28' could be connected to the chamber 16 and releasably secured to the bladder 12. With this arrangement, the bladder is readily receivable in the cavity formed by sheet 26 and, when so received, is held in juxtaposition with the chamber 16 by the material 28'. If desired in this alternate embodiment an additional sheet of material may be releasably secured to the perimeter of the chamber 16 and extend across, or be releasably connected to, the upper portion of the bladder 12. Such material encloses the bladder and/or prevents the bladder from pulling away from the chamber 16 when one sits on the edge of the sleep system 10.

The bladder 12 is formed of a sheet of flexible, dimensionally stable, fluid impervious material, such as polypropelene or polyethelene for example. The bladder is typically filled with fluid, such as water, and may include any of a variety of mechanisms to inhibit motion of the water induced by movement of a body on the system 10. The motion inhibiting mechanisms may include for example, baffles, fibrous material, or foam material. As discussed above, the art of motion inhibiting mechanisms is under a continuing state of change with advances being made all the time. A [principle] *principal* advantage of this invention is that forming the system 10 with a readily accessible chamber for the bladder 12, enables any particular bladder to be exchanged for a different and improved bladder without replacing the entire system.

Figure 3:
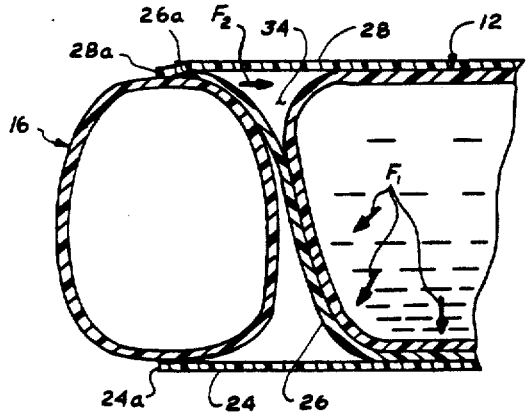
FIG. 3 is a view in cross-section of a portion of the improved universal floatation sleep system taken along lines 3—3 of FIG. 1.

As best shown in FIG. 3, the fluid within the bladder 12, located in the chamber 34, exhibits an internal pressure designated by the arrows $F_1$. The fluid pressure $F_1$ acts on the walls of the bladder and, along with the weight of the fluid filled bladder, on sheet 26 to, inturn, exert a force, designated by the arrow $F_2$ on the upper portion of the chamber 16 of the marginal perimeter support 14. Such force $F_2$ thus acts to effectively hold the marginal perimeter support in operative supporting relation with the bladder 12. This also serves to maintain the overall shape of the system 10 to its desired configuration (e.g., the rectangular prism as shown in FIG. 1).

The invention has been described in detail with particular reference to a preferred embodiment thereof, but it will be understood that variations and modifications can be effected within the spirit and scope of the invention.

I claim:

1. An improved floatation sleep system comprising:

means for supporting a human body;

means for forming a marginal perimeter support for said body supporting means, said support means including [a continuous] *an* elongated chamber;

a first flexible, dimensionally stable, fluid impervious sheet connected to an upper portion of said elongated chamber, such sheet being of an overall dimension greater than the distance between opposed portions of such chamber and less than the distance between such opposed portions plus twice the vertical height of such chamber; and a second flexible, dimensionally stable sheet extending between opposed portions of said elongated chamber, said second sheet being integrally connected to an upper portion of a part of such chamber and readily releasably secured to the remaining part of such upper portion; whereby said first and second sheets form a completely enclosed interior chamber adapted to receive and contain said body supporting means, such interior chamber being accessible through such releasably secured part of said second sheet and said elongated chamber.

2. The invention of claim 1 wherein said elongated chamber of said marginal perimeter support means includes a plurality of interconnected cells, said cells including means for readily accessing the interior of such cells respectively to supply perimeter support material thereto.

3. The invention of claim 1 wherein said elongated chamber of said marginal perimeter support means includes a plurality of interconnected cells, said cells including means for readily accessing the interior of such cells respectively to supply pressurized air thereto.

4. A floatation sleep system having a body supporting bladder and a marginal perimeter support for such bladder, said floatation sleep system being of a universal construction so as to enable the ready interchange of bladders and marginal perimeter supports, said system comprising:

a bladder receiving chamber formed of flexible dimensionally stable material and including means for readily accessing the interior of such chamber to enable a bladder to be inserted therein; and

[a continuous] *an* elongated chamber surrounding the marginal perimeter of said bladder receiving chamber and including means for readily accessing the interior thereof to supply a bladder marginal perimeter support thereto, said [continuous] elongated chamber connected at its upper portion to the upper portion of said bladder receiving chamber, said [continuous] elongated chamber and said bladder receiving chamber being of respective dimensions such that said bladder receiving chamber is suspended by said [continuous] elongated chamber whereby, when a bladder is inserted in said bladder receiving chamber and a marginal perimeter support is inserted in said [continuous] elongated chamber, the weight of such bladder exerts a force through said bladder receiving chamber on the [continuous] elongated chamber to hold such marginal perimeter support in effective support relation to such bladder.

5. The invention of claim 4 wherein said [continuous] elongated chamber includes means for dividing such chamber into a plurality of opposed independent cells, and said means for readily accessing the interior of said elongated chamber includes means for supplying bladder marginal perimeter support to each of said independent cells.

6. The invention of claim 5 wherein said bladder receiving chamber includes a sheet of flexible, dimensionally stable material connected to an upper portion of said cells and extending therebetween for supporting a fluid filled bladder, such sheet being of an overall dimension greater than the distance between opposed cells and less than the distance between such opposed cells plus twice the vertical height of such cells, whereby the weight of a bladder supported by such sheet exerts forces through such sheet on said cells to urge such cells into marginal perimeter support with such bladder.

7. The invention of claim 6 wherein said bladder receiving chamber further includes a second sheet of flexible, dimensionally stable material extending between said cells, means for connecting said second sheet to an upper portion of at least two adjacent cells, and means for readily releasably securing said second sheet to a side portion of at least two adjacent cells.

8. The invention of claim 7 wherein said readily releasably securing means is releasable mating closure members secured to such cells and such second sheet respectively.

9. The invention of claim 4 wherein said bladder receiving chamber includes first and second sheets of flexible dimensionally stable material, said first sheet being connected to the upper portion of said continuous elongated chamber and adapted to support a fluid filled bladder, and said second sheet being connected to an upper portion of at least a part of said elongated chamber; and wherein said means for readily accessing the interior of said bladder receiving chamber includes means for readily releasably securing said second sheet to the remaining part of said elongated chamber.

10. The invention of claim 9 wherein the dimension of said first sheet is greater than the distance between opposed portions of said elongated chamber, and less than the distance between such opposed portions plus twice the vertical height of such chamber, whereby the weight of a bladder supported by such first sheet exerts forces through such sheet on said elongated chamber to maintain such chamber in operative marginal perimeter support with such bladder.

11. A floatation sleep system for supporting a human body comprising:

means for forming a marginal perimeter support, said support means including [a continuous] *an* elongated chamber;

a flexible, dimensionally stable, fluid impervious sheet connected to an upper portion of said elongated chamber, such sheet being of an overall dimension greater than the distance between opposed portions of such chamber and less than the distance between such opposed portions plus twice the vertical height of such chamber to define a bladder receiving cavity; and a readily removable bladder, adapted to contain body supporting means, located in said cavity.

12. The invention of claim 11 further including:

means secured to at least a portion of the perimeter of said chamber and extending at least partially between opposed portions of said chamber to retain said bladder within said cavity.

13. The invention of claim 12 wherein said retaining means includes a flexible, dimensionally stable sheet extending fully between opposed portions of said chamber and releasably secured to the full perimeter thereof.

14. The invention of claim 12 wherein said retaining means includes a flexible, dimensionally stable strip of material connected to the upper portion of said bladder, said material being adapted to be releasably secured to the full perimeter of said chamber.

*15. A floatation sleep system having a body-supporting bladder and a marginal perimeter support for such bladder, said system comprising:*

*means, formed of a flexible dimensionally stable material, including first and second portions, said first portion defining a cavity for receiving a body-supporting bladder and said second portion defining a chamber for receiving a marginal perimeter support for such bladder, said first and second portions being structurally interrelated such that said first portion is suspended by said second portion, so that when a bladder is received in said first portion and a marginal perimeter support is received in said second portion, the weight of said bladder exerts a force through said first portion on said second portion to hold said marginal perimeter support in effective support relation to said bladder.*

* * * * *